Dec. 27, 1960  H. POMERNACKI  2,965,971
ELECTRONIC GEAR INSPECTION MACHINE
Filed July 16, 1956  3 Sheets-Sheet 1
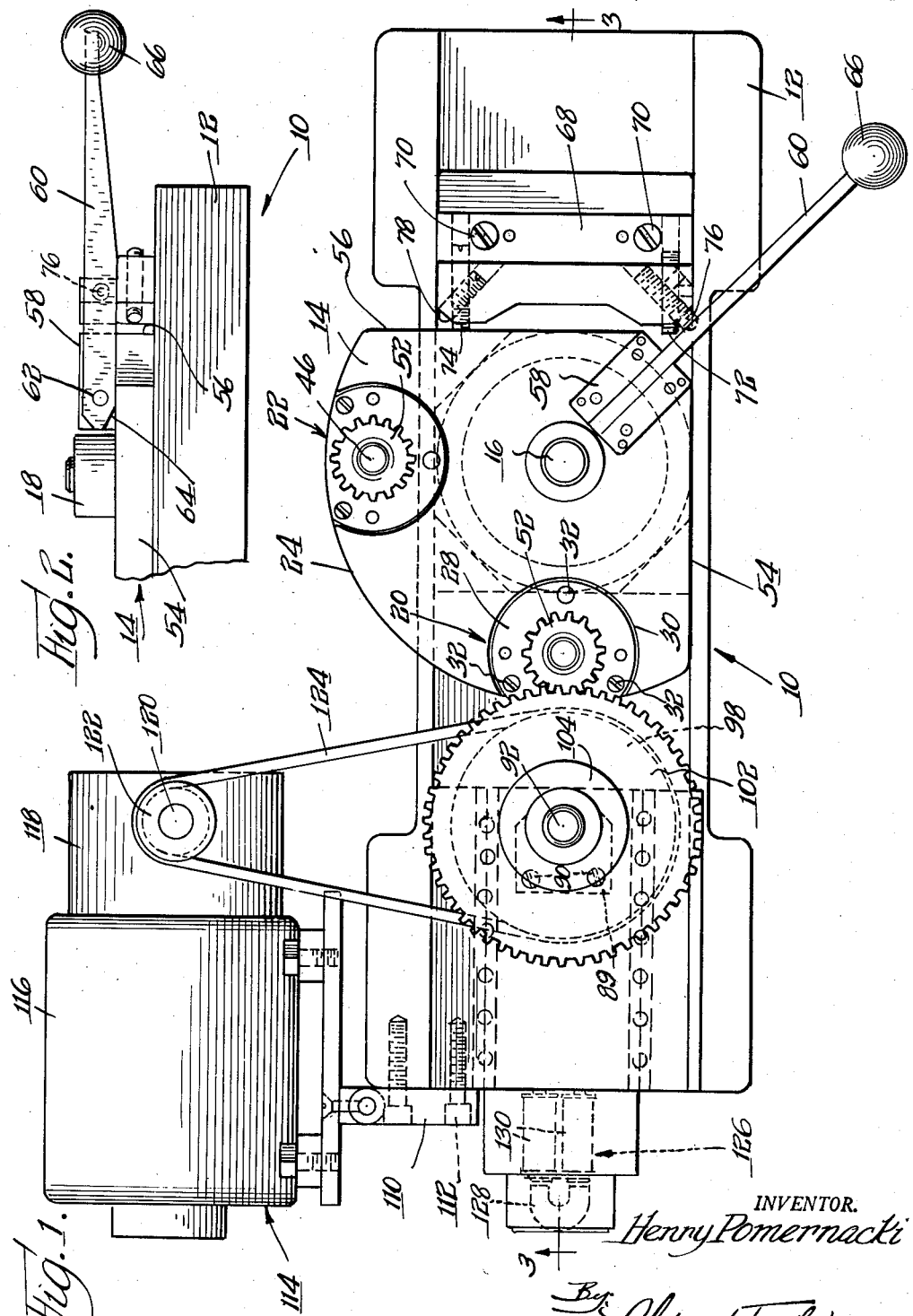
INVENTOR.
Henry Pomernacki
By Olson & Trexler attys Dec. 27, 1960 H. POMERNACKI 2,965,971
ELECTRONIC GEAR INSPECTION MACHINE
Filed July 16, 1956 3 Sheets-Sheet 2
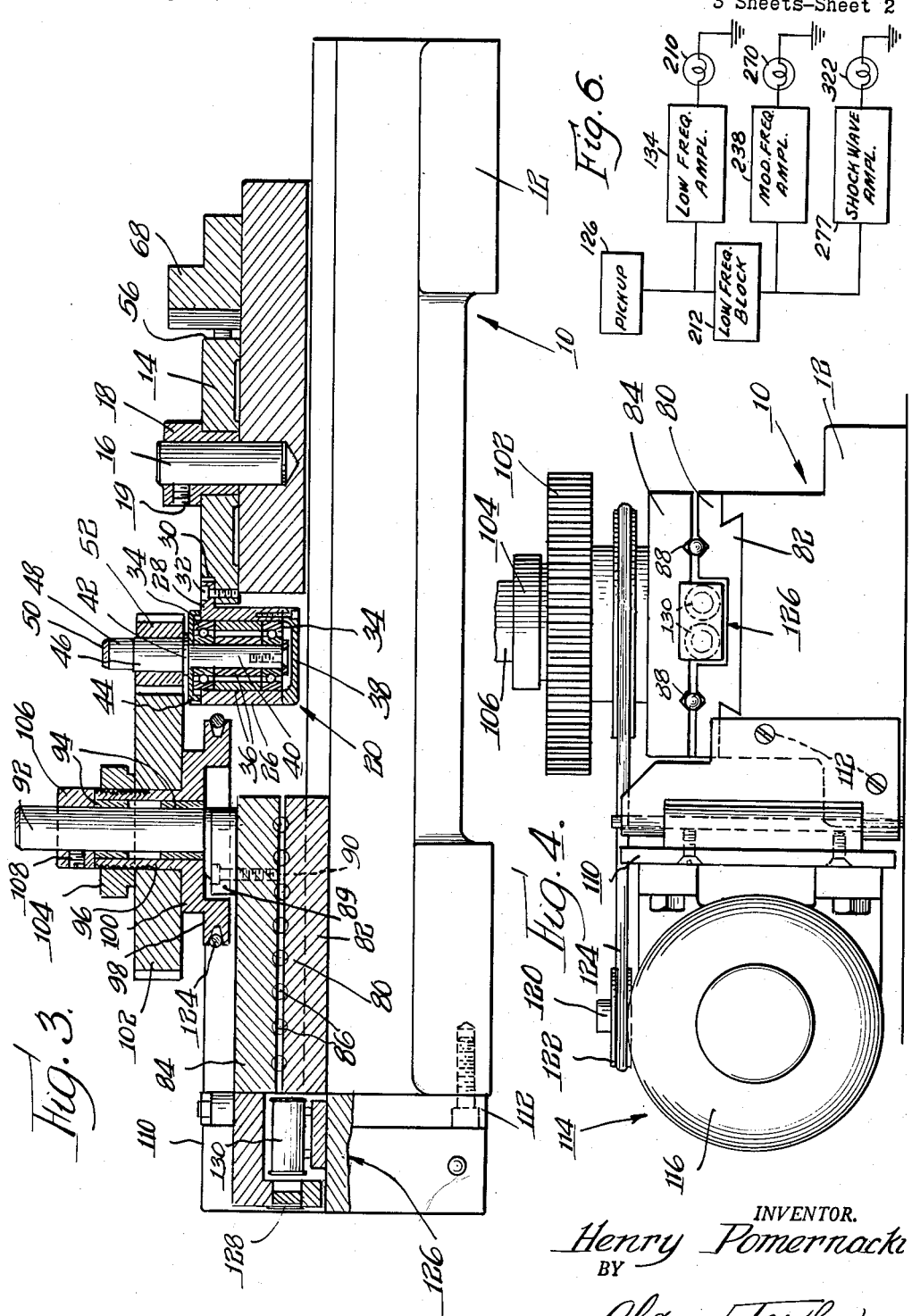
INVENTOR.
Henry Pomernacki
BY
Olson & Trexler
Attys

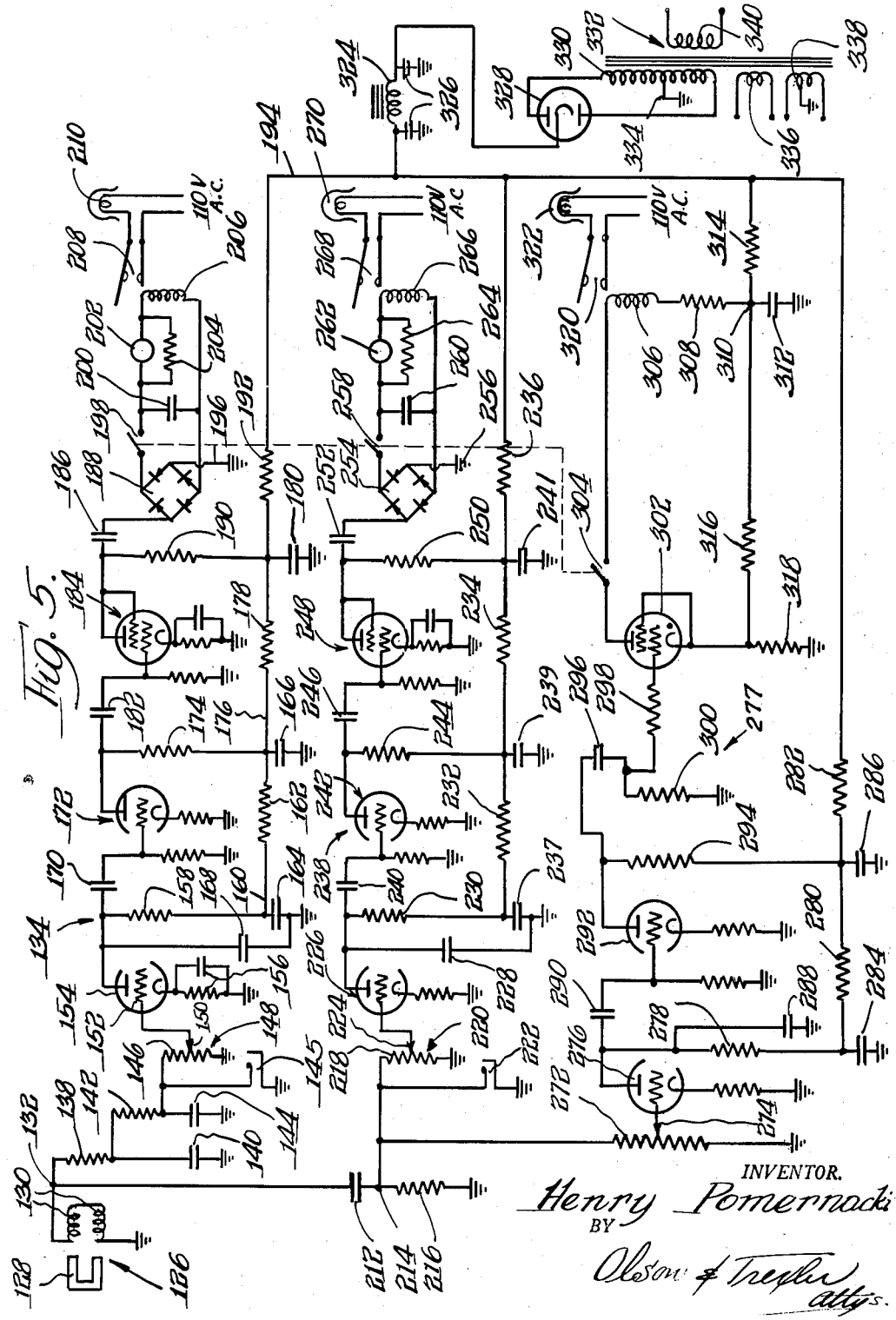

006# United States Patent Office 2,965,971
Patented Dec. 27, 1960

2,965,971

ELECTRONIC GEAR INSPECTION MACHINE

Henry Pomernacki, Chicago, Ill., assignor to Illinois Tool Works, Chicago, Ill., a corporation of Illinois Filed July 16, 1956, Ser. No. 598,018

6 Claims. (Cl. 33—179.5)

This invention is concerned generally with the art of inspecting gears, and more particularly with an electronic gear inspection machine.

Machines for checking or inspecting gears by rolling them with a master are well known. Errors which occur in the gear, such as the tooth-to-tooth errors, as a result of spacing and involute variations, runout errors, or nicks, are reflected in center distance variations, the master gear and the gear being checked or inspected being mounted for relative diametral movement. In ordinary inspection machines comprising the system just outlined, a pen is utilized to mark a line on a moving paper in accordance with center distance variations. The movement of the paper is related to the rotation either of the gear to be checked, or the master gear. Alternatively, an indicator may be used. In either event, a needle or pen arm must be able to reflect the center distance movement without overshooting, and this materially limits checking or inspecting speed.

Accordingly, it is an object of this invention to provide an electronic gear inspecting machine operable at higher testing speeds.

More particularly, it is an object of this invention to provide a gear inspection machine of the foregoing type wherein electronic detection and indication apparatus replaces the usual indicator or recorder.

It is another object of this invention to provide a gear inspection or testing machine having electronic apparatus for flashing a light signal, or for operating solenoid controlled gates to guide gears into different chutes, in accordance with whether the gears are acceptable or rejected.

Furthermore, it is an object of this invention to provide a gear inspection machine which provides indications in accordance with the type of error found.

Other and further objects and advantages of the present invention will be apparent from the following description when taken in connection with the accompanying drawings wherein:

Fig. 1 is a top view of a machine embodying the principles of the invention;

Fig. 2 is a detail side view of the machine;

Fig. 3 is a longitudinal sectional view taken through the machine;

Fig. 4 is an end view of the machine as taken from the left side of Fig. 1;

Fig. 5 is a schematic wiring diagram of the electronic portion of the machine; and Fig. 6 is a block diagram of the circuit.

Referring now in greater particularity to the drawings, and first to Figs. 1–4, there is shown a gear inspection machine 10 including a base 12. A testing plate 14 is pivotally mounted on the base 12 by means of an axle or pivot pin 16 and a bearing 18 secured thereon by means such as a set screw 19. The plate 14 carries a pair of gear supporting fixtures 20 and 22 mounted substantially at the ends of mutually perpendicular radii of the plate 14, the plate having an arcuate outer edge at 24.

The gear supporting fixture 20 is shown in detail in Figs. 1 and 3 and includes a bearing supporting cylinder 26 having a flange 28 at the upper end thereof. This flange is received in an arcuate recess 30 in the top of the plate 14, and is held in place by means such as screws 32. Axially spaced ball bearings 34 are held in spaced relation within the cylinder 26 by means of a pair of radially spaced sleeves 36, and a bearing cap 38 closes the lower end of the cylinder 26. An axle 40 is rotatably mounted in the ball bearings 34, and has an enlarged ring or collar 42 thereon spaced above the cap 44 at the upper end of the cylinder 26 sealing the bearings 34 against the entrance of dirt and the like. Above the ring 42 there is a gear receiving axle portion 46, having a reduced upper end 48 with a tapered tip 50 for facilitating placement of a gear 52 on the axle portion 46 before testing of a gear.

The plate 14 is provided with a pair of mutually perpendicular sides 54 and 56. A bracket 58 is mounted on top of the plate substantially at the apex of the sides 54 and 56, and this bracket pivotally carries a handle 60 on a pivot pin 62 in the bracket. The handle is provided adjacent the pivot pin 62 with a beveled lower edge 64 to enable the handle to be lifted to a predetermined degree, and a ball 66 is mounted on the outer end of the handle to facilitate lifting of the handle.

A stop bracket 68 is secured to the top of the base 12 by means such as screws 70. The stop bracket is provided with adjustable set screws 72 and 74 respectively engageable with the mutually perpendicular sides 54 and 56 of the plate 14. Spring pressed plungers 76 and 78 are provided adjacent the stops 72 and 74, and arranged angularly relative thereto. Thus, when the side 56 is against the stop 74, as is shown in Fig. 1, the spring pressed plunger 76 engages the handle 60 to hold the side 56 firmly against the stop 74. Conversely, when the handle 60 is raised, it will clear the plunger 76 and stop bracket 68 to allow pivoting of the plate 14 through ninety degrees, and upon lowering of the handle 60 it is engaged by the spring pressed plunger 78, the side 54 thereby being held firmly but resiliently against the adjustable stop 72.

A slide base 80 is mounted at the opposite end of the base 12 by means of the usual dovetail 82, and a slide 84 is conventionally mounted thereon by means of bearing balls 86 received in complementary V grooves 88 in the slide and in the slide base. The usual spring means (not shown) hold the slide down on the balls, and urge the slide toward the plate 14.

A bracket 89 is secured by means such as screws 90 to the top of the slide 84 at the end thereof adjacent the plate 14. This bracket carries an upstanding axle 92. Sleeve bearings 94 on the axle 92 receive a cylindrical sleeve portion 96 of a pulley 98 having a shoulder 100. A master gear 102 surrounds the sleeve 96 and rests against the shoulder 100. The upper end of the sleeve or cylinder 96 is threaded, and a nut 104 thereon clamps the gear 102 against the shoulder 100. A collar 106 is held down against the top of the cylinder or sleeve 96 by means of a set screw 108 engaging the axle 92 to hold the pulley 98 down in its desired position.

A bracket 110 is mounted at the side of the base 12 by means such as screws 112, the bracket being at the same end of the base as the slide 84. The bracket supports a power source 114 comprising an electric motor 116 and a speed reducer 118. The output shaft 120 of the speed reducer is provided with a pulley 122 which is relatively smaller than the pulley 98, and a belt 124 is passed over the pulleys 98 and 122 whereby to provide power driving of the pulley 98, and hence of the master gear 102.

It will be apparent that the handle 60 is swung back and forth through a ninety degree arc in the manner aforesaid whereby to bring the axle portions 46 carrying the gears 52 to be tested alternatively into position whereby one or the other of the gears 52 is meshed with the master gear 102 for checking of the gear 52. Whichever of the axle portions 46 is positioned away from the master gear 102 is in a free position where the tested gear 52 readily is removed and replaced by another gear to be tested. In the form of the invention shown, such removal and adding of gears would be done manually, but it is to be understood that this could be done automatically if desired.

An electronic pickup 126 (Figs. 1, 3, 4 and 5) is mounted on the slide 84 and slide base 82 to detect relative movement of the slide and slide base. Such pickups are well known in the art and include a permanent horseshoe magnet 128 and adjacently positioned pickup coils 130.

With reference to Fig. 5, it will be seen that the pickup coils 130 are connected in series with one another, and that the series combination is grounded. The opposite end of the series combination is connected by a wire to a junction point 132. The junction point 132 is connected to the input of a low frequency amplifier circuit 134. The input includes a resistor 138 and a shunted grounded capacitor 140. The junction of the resistor and capacitor is connected to a resistor 142, and the latter is shunted to ground by a capacitor 144. A jack receptacle 145 is connected between the input and ground. The junction of the resistor 142 and capacitor 144 also is connected to the grounded resistor 146 of a potentiometer 148. The sliding tap 150 of the potentiometer is connected to the grid 152 of an amplifying vacuum tube 154. By way of example, the tube 154 is a type 6SL7. The potentiometer resistance is 500,000 ohms, the resistors 138 and 142 are each 100,000 ohms, and the capacitors 140 and 144 are each .1 microfarad. The tube 154 is provided with the usual self-biasing cathode circuit comprising parallel connected resistor and capacitor 156.

The plate of the tube 154 is connected through a load resistor 158 to a B+ bus line 160, the latter being connected to a smoothing resistor 162 and grounded capacitors 164 and 166. The plate also is grounded through a relatively small capacitor 168. By way of specific example, the capacitor may be .03 microfarad. This capacitor shunts any unwanted relatively high frequency signals to ground.

The output of the amplifier tube 154 is connected through a relatively high value capacitor 170 to the input circuit of an amplifier stage 172, which by way of example may include the second half of the 6SL7 tube previously mentioned. The capacitor 170 may be a .25 microfarad capacitor so as to pass low frequency signals. A load resistor 174 is connected to a B+ wire 176 connected to a resistor 178 and a power supply condenser 180.

The output of the amplifier stage 172 is coupled by another capacitor 182 of relatively high value to an amplifier stage 184. Again, the capacitor 182 may be .25 microfarad. The output of the amplifier stage 184 is connected through a large capacitor 186 to a bridge rectifier 188. The amplifier 184 is provided with plate potential through a resistor 190 connected to the junction of the resistor 178 and the capacitor 180, and this junction further is connected through a resistor 192 to a B+ bus 194. By way of specific example, the amplifier 184 incorporates a 6V6 tube, and the capacitor 186 is a 2 microfarad capacitor. The bridge rectifier 188 preferably is of the dry disc type well known in the art, and is grounded at 196.

The output of the bridge rectifier 188 is connected through a switch 198 to a smoothing capacitor 200, to a series connected micro-ammeter 202 shunted by a resistor 204, and connected in series with a relay coil 206.

The smoothing capacitor 200 is a 20 microfarad capacitor, the micro-ammeter 202 is a 100 micro-ampere ammeter, the shunting resistor 204 is approximately a 50 ohm resistor, and the relay 206 has an impedance of approximately 10,000 ohms.

The relay coil 206 closes relay switch contacts 208 which are in series with a 110 volt A.C. source and a signal light 210. Thus, whenever a low frequency signal is amplified by the low frequency amplifier 134, and rectified by the bridge rectifier 188, the relay contacts 208 are closed and the light bulb 210 is illuminated to indicate a defective gear.

The junction point 132 of the input is connected through a capacitor 212 to a junction 214. The capacitor 212, by way of example, is .1 microfarad, the same value as the capacitors 140 and 144. The junction point 214 is shunted to ground by a 10,000 ohm resistor 216, and also is connected to the resistor 218 of a potentiometer 220, the latter being grounded, and shunted to ground by a jack receptacle 222. The sliding tap 224 on the potentiometer 220 is connected to the input of a triode amplifier stage 226. The output of this stage is shunted to ground by a .001 microfarad condenser 228 to remove any undesired high frequency components from the output. Plate power is provided for the amplifier stage 226 through a resistor 230, as will be evident, through a B+ network including dropping resistors 232, 234, and 236, and shunting capacitors 237, 239, and 241. The last three mentioned capacitors specifically have a value of 8 microfarads each, the resistors 232 and 234 preferably each are 100,000 ohms, and the resistor 236 preferably is 5,000 ohms, these values being the same as for the corresponding components of the low frequency amplifier 134.

The amplifier stage 226 comprises a part of a moderate frequency amplifier 238, and the output of this stage is coupled through a capacitor 240 of relatively small value to the input of a triode amplifier stage 242. Specifically, the capacitor 240 is .05 microfarad as compared to the .25 microfarad value of the capacitor 170. Preferably the triode tubes of the amplifier stages 226 and 242 comprise the two halves of a 6SL7 tube.

The amplifier stage 242 is provided with plate power through a load resistor 244, as will be evident, and the output is coupled through a capacitor 246 of relatively low value to another amplifier stage 248. The capacitor 246 is of the same .05 microfarad value as the capacitor 240, as compared to the relatively large .25 microfarad value of the corresponding capacitor 182 of the low frequency amplifier.

The amplifier 248, like the amplifier 184, is designed to provide substantial output power, and to this end also preferably comprises a type 6V6 tube. A plate load resistor 250 provides power for the amplifier stage 248, and the output is coupled through a .5 microfarad capacitor 252 to a bridge rectifier 254 grounded at 256.

The output of the rectifier 254 is connected through a switch 258, shunted by a smoothing capacitor 260 of 8 microfarads, to a 100 micro-ampere micro-ammeter 262 (the latter being shunted by a 12 ohm resistance 264), the switch 258 and micro-ammeter 262 being connected in series with a relay coil 266. The relay coil is arranged to close relay contacts 268 which are in series with a 110 volt A.C. potential, and an indicator lamp 270. Thus, when a moderate frequency is amplified by the moderate frequency amplifier 238, and is rectified by the bridge rectifier 254, the relay contacts 268 are closed to cause the indicator lamp 270 to light up.

As will be apparent, the micro-ammeters 202 and 262 allow initial setting of the two amplifiers by means of the potentiometers 148 and 220 for determining the magnitude of errors that will be necessary to cause the indicator lamps 210 and 270 respectively to be illuminated.

The junction 214 further is connected to a potentiometer 272, the sliding tap 274 of which is directly connected to a triode amplifier stage 276 of a "shock wave" amplifier 277. This amplifier is provided with plate power through a load resistor 278 connected to a power supply network comprising resistors 280 and 282, and shunting capacitors 284 and 286 to the B+ bus line 194. The resistors 280 and 282 preferably each are of 100,000 ohms, and the capacitors 284 and 286 preferably each are of 8 microfarads.

The output of the amplifier stage 276 is shunted to ground by a .001 microfarad capacitor 288, and also is coupled through a relatively large capacitor 290 to the input of an amplifier stage 292. The relatively large capacitor 290 preferably is of .05 microfarad capacity. It will be noted that both of the amplifier stages 276 and 292 are provided with unbypassed cathode resistors. As in the case of the tubes 172, 226, and 242, the bypass capacitor is omitted for greater tube gain. The tubes of the two stages 276 and 292 preferably comprise the two halves of a 6SL7 tube. The stage 292 is provided with plate power through the load resistor 294 connected to the junction of the resistors 280 and 282.

The output of the amplifier stage 292 is coupled through a relatively small capacitor 296 to a series grid resistor 298 and a shunting grid resistor 300. The capacitor 296 preferably is of .05 microfarad value, the resistor 298 preferably is of 10,000 ohms, and the resistor 300 is preferably of 100,000 ohms.

The grid resistor 298 is connected to the control grid of a thyratron tube 302. This tube preferably is a type 2050, and the plate thereof is connected through a switch 304 to a relay coil 306, the latter being connected to a current limiting resistor 308, which in turn is connected to a power supply junction point 310, the latter being shunted to ground by an 8 microfarad capacitor 312. This junction point is connected by a resistor 314 to the B+ bus line 194, and also is connected to a voltage divider resistor 316 which is connected to a grounded voltage divider resistor 318. The junction between the resistors 316 and 318 is connected to the screen grid and cathode of the thyratron tube 302. The resistor 314 preferably is 10,000 ohms, the resistor 316 is 60,000 ohms, and the resistor 318 is 2,000 ohms.

The relay coil 306 is arranged to close relay contacts 320, and these are in series with a 110 volt A.C. source and an indicator lamp 322. Certain types of signals, as will be explained hereinafter, operate the amplifier stages 276 and 292 whereby to cause the thyratron tube 302 to fire, thus closing the relay contacts 320, and illuminating the lamp 322.

The B+ bus line 194 is provided with power from a pi filter including an 8 henry choke 324 a pair of 10 microfarad capacitors 326. The pi filter is connected to the cathode of a full wave rectifier tube 328, such as a type 5Z4, the plates whereof are connected to the opposite ends of a high voltage winding 330 of a power supply transformer 332. The winding 330 is provided with a grounded center tap 334. A 5 volt winding 336 is provided on the transformer for filament power for the rectifier tube 328, and a 6.3 volt center tapped filament winding 338 also is provided. The primary winding 340 is provided with 110 volts A.C. power as will be understood.

Tooth-to-tooth errors, runout errors, and nicks provide radically different frequencies from the pickup 126. Runout is indicated by a frequency related to the rotational speed of the gears, tooth-to-tooth errors are of a frequency equal to the product of the speed in revolutions per minute and the number of teeth in the gear, and nicks have no systematic frequency. Nicks may occur once or several times per revolution of a gear, and in order to be detected must be in excess of the tooth-to-tooth errors. The nicks provide a radical movement of the checking slide, and not necessarily a cyclic frequency. Since gears seldom have less than ten teeth, it will be appreciated that the frequency generated by tooth-to-tooth errors is at least ten times the frequency generated by runout errors.

It is the two different frequencies of the runout and tooth-to-tooth errors which determine the r.p.m. at which the gear is driven. It cannot be much less than two cycles per second, or approximately 120 r.p.m. of the gear, because of inherent amplifier requirements. At the same time, the product of the r.p.m. and the number of teeth of the gear must not exceed a frequency at which the checking slide cannot respond to the gear errors which are to be detected. In other words, the limit for low frequency of the runout error is determined by the amplifier, while the high limit of the tooth-to-tooth errors is determined by the ability of the checking slide to keep up with tooth-to-tooth errors of the gear. As just noted, the low limit is approximately 120 r.p.m. of the gear. The upper limit does not have an equally precise figure, but depends upon the mass of the slide. and the spring force biasing the slide. These considerations determine the speed at which the gear is rotated.

Although reference is made broadly to a master gear, it will be understood that a simple master gear, or any of various types known in the art for checking various errors in addition to those listed are within the contemplation of the invention.

In accordance with one specific example of the invention, the circuit values of the low frequency amplifier 134, as indicated previously, are chosen so as to amplify a frequency of 11.1 cycles per second. Correspondingly, the moderate frequency amplifier 238 amplifies signals of 145 cycles per second frequency. The extremely low frequency signals applied by the runout errors readily are amplified by the low frequency amplifier stage, but are neither passed by the capacitor 212, nor amplified by the other two amplifiers. On the other hand, the low frequency amplifier will not respond to the moderately low frequencies of the tooth-to-tooth errors, and the magnitude of the signals of the tooth-to-tooth errors is not great enough to operate the third amplifier. The potential developed by nicks is sufficiently rapid and of high intensity (i.e., a very steep wavefront, or "shock wave") that neither of the amplifiers 134 and 238 responds, but the third amplifier is operated to cause the thyratron 302 to fire.

The movement of the test gear supporting means relative to the master gear supporting means during a checking operation when a nick is encountered is relatively rapid. In other words, it is relatively rapid as compared with the movements produced by runout and tooth-to-tooth errors. Obviously, the rapidity is limited due to inherent inertia, friction, and other factors inherent in the machine. The third circuit, i.e., that of the "shock wave" amplifier 277 is adjusted so that signals below a certain intensity will not cause the thyratron tube to fire. However, when the amplitude of the wave generated by the detector (as created by the velocity of the carriage) is above a certain predetermined level, the thyratron fires.

In summation, the equipment has a design parameter of detection that sets the limits of operation. Thus, a severe nick in a tooth surface will not be detected if the work and master gears are rotated too rapidly. However, within the limits in which the machine is designed to operate, a nick will cause a relatively rapid change in movement of the detection mechanism, and, as compared with the signals generated by a non-nicked surface, this signal producing movement is rapid and severe.

The switches 198, 258, and 304 are provided with means for opening them as a gear to be checked is brought into engagement with the master gear so that the initial engagement will not cause illumination of the signal lamps. The switches therefore preferably are ganged, and may be arranged for manual actuation, or for actuation through the movement of the gear carrying plate 14.

It will be apparent from the foregoing that in accordance with this invention tooth-to-tooth and runout errors and nicks can be detected at a much higher speed than has been possible with the prior art mechanical checking devices. It will be understood that the specific example herein shown and described is for illustrative purposes, and that various changes will no doubt be apparent to those skilled in the art, and are to be understood as forming a part of the invention insofar as they fall within the spirit and scope of the appended claims.

The invention is claimed as follows:

1. A gear inspection machine comprising means mounting a master gear, means for rotating said master gear, means for rotatably supporting a gear to be tested, means for moving said gear supporting means and said master gear mounting means relatively toward and away from one another to effect meshing and separation of a test gear and said master gear, means permitting relative movement of said gear supporting means and said master gear mounting means toward and away from one another while in mesh in accordance with errors in the gear being tested, common means coacting between the gear supporting means and the gear mounting means and establishing an electrical potential in accordance with the relative movement thereof while in mesh, said potential having distinguishing characteristics as to frequency and magnitude in accordance with the type of error causing the relative movement, and control means connected to said common means having a plurality of operated means at least one of which is frequency sensitive and another of which is sensitive as to magnitude and wavefront and selectively actuated by said electrical potential in accordance with the type of error detected.

2. A gear inspection machine comprising means mounting a master gear, means for rotating said master gear, means for rotatably supporting a gear to be tested, means for moving said gear supporting means and said master gear mounting means relatively toward and away from one another to effect meshing and separation of a test gear and said master gear, means permitting relative movement of said gear supporting means and said master gear mounting means toward and away from one another while in mesh in accordance with errors in the gear being tested, common means coacting between the gear supporting means and the gear mounting means and establishing an electrical potential in accordance with relative movement thereof, said potential having distinguishing characteristics as to frequency and magnitude in accordance with the type of error causing the relative movement while in mesh, a plurality of characteristic sensitive amplifier means connected to said common means and at least one of which is frequency sensitive and another of which is sensitive as to magnitude and wavefront and selectively amplifying the potentials established by different types of errors, and control means actuated by said amplifier means in accordance with amplification of said potentials.

3. A gear inspection machine comprising means mounting a master gear, means for rotatably supporting a gear to be tested, means for rotating one of said gears, means for moving said gear supporting means and said master gear mounting means relatively toward and away from one another to effect meshing and separation of a test gear and said master gear, means permitting relative movement of said gear supporting means and said master gear mounting means toward and away from one another while in mesh in accordance with errors in the gear being tested, common means coacting between the gear supporting means and the master gear mounting means and establishing an electrical potential in accordance with the relative movement thereof while in mesh, said potential having parameters of frequency and intensity varying in accordance with the type of error detected, a plurality of frequency and intensity parameter sensitive amplifying means connected to said common means and selectively amplifying the potentials established by different types of errors, and a plurality of control means respectively actuated by said amplifying means in accordance with the parameters of the errors detected.

4. A gear inspection machine comprising means mounting a master gear, means for rotatably supporting a gear to be tested, means for rotating one of said gears, means for moving said gear supporting means and said master gear mounting means relatively toward and away from one another to effect meshing and separation of a test gear and said master gear, means permitting relative movement of said gear supporting means and said master gear mounting means toward and away from one another while in mesh in accordance with errors in the gear being tested, common electrical means coacting between the gear supporting means and the master gear mounting means, said common electrical means including a part fixed relative to said gear supporting means and a part fixed relative to said master gear mounting means, said parts relatively moving in accordance with the relative movement of said gear supporting means and said master gear mounting means and thereby establishing an alternating current electrical potential varying in frequency and magnitude in accordance with relative movement of said parts, the potential in accordance with runout errors being of a low frequency, the potential established by tooth-to-tooth errors being of a much higher frequency, and the potential established by nicks being of a relatively high intensity, an amplifying channel having means tuned to low frequencies for amplifying low frequency signals established by runout errors, an amplifying channel tuned to higher frequencies for amplifying the higher frequency potentials established by tooth-to-tooth errors, and an amplifying channel having means normally biased to be cut off and responsive to the high intensity potential established by nicks to become operatively, and means individually operated by the various amplifying channels for performing a control function in accordance with the type of error detected.

5. A gear inspection machine as set forth in claim 4 wherein the means for performing a control function includes a relay for each amplifying channel.

6. A gear inspection machine as set forth in claim 4 wherein each of the first two amplifying channels incorporates a rectifier operating the corresponding means for performing a control function, and wherein the third amplifying channel incorporates a thyratron for this purpose.

References Cited in the file of this patent

UNITED STATES PATENTS

| | | |
|---|---|---|
| 1,981,693 | Firestone et al. | Nov. 20, 1934 |
| 2,412,240 | Williams | Dec. 10, 1946 |
| 2,421,578 | Reason | June 3, 1947 |
| 2,468,648 | Abbott | Apr. 26, 1949 |
| 2,780,006 | Flair | Feb. 5, 1957 |
| 2,780,007 | Pomernacki | Feb. 5, 1957 |
| 2,854,757 | Roeger | Oct. 7, 1958 |
| 2,913,829 | Artin | Nov. 24, 1959 |